United States Patent
Anhut et al.

(10) Patent No.: US 12,105,271 B2
(45) Date of Patent: Oct. 1, 2024

(54) MICROSCOPE AND METHOD FOR MICROSCOPIC IMAGE RECORDING WITH VARIABLE ILLUMINATION

(71) Applicant: Carl Zeiss Microscopy GmbH, Jena (DE)

(72) Inventors: Tiemo Anhut, Jena (DE); Daniel Schwedt, Jena (DE); Yauheni Novikau, Jen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 602 days.

(21) Appl. No.: 17/378,991

(22) Filed: Jul. 19, 2021

(65) Prior Publication Data
US 2022/0043246 A1    Feb. 10, 2022

(30) Foreign Application Priority Data
Aug. 5, 2020   (DE) .................. 10 2020 209 889

(51) Int. Cl.
G02B 21/00   (2006.01)
(52) U.S. Cl.
CPC ..... G02B 21/0052 (2013.01); G02B 21/0032 (2013.01); G02B 21/0036 (2013.01)
(58) Field of Classification Search
CPC ........... G02B 21/0052; G02B 21/0032; G02B 21/06; G02B 21/0036; G02B 21/008
See application file for complete search history.

(56) References Cited

U.S. PATENT DOCUMENTS

| | | | |
|---|---|---|---|
| 9,638,909 B2 | 5/2017 | Wilson et al. | |
| 2016/0334613 A1* | 11/2016 | Ishiwata | G02B 21/367 |
| 2017/0280076 A1* | 9/2017 | Lippert | G02B 21/361 |
| 2019/0113731 A1* | 4/2019 | Betzig | G02B 27/0025 |
| 2020/0300762 A1* | 9/2020 | Matsumoto | G02B 23/26 |

(Continued)

FOREIGN PATENT DOCUMENTS

| | | |
|---|---|---|
| DE | 102014102215 A1 | 8/2015 |
| WO | 2008078083 A1 | 7/2008 |
| WO | 2015124648 A1 | 8/2015 |

OTHER PUBLICATIONS

German Search Report dated Feb. 16, 2021 for DE 10 2020 209 889.1.

*Primary Examiner* — Frantz B Jean
(74) *Attorney, Agent, or Firm* — Duane Morris LLP (57) ABSTRACT

The invention relates to a microscope having an excitation beam path for guiding excitation light, having a laser light source for providing a laser light beam as excitation light and having a scanning apparatus for aligning and moving a focused laser light beam in the entrance pupil of an illumination objective; wherein the laser focus is directed into an entrance point that is offset with respect to the optical axis of the illumination objective; and also having a detection beam path for guiding detection light, comprising a microlens array having a focal plane for generating partial imaged presentations and a detector arranged in the focal plane of the microlens array for capturing the partial imaged presentations. In addition, an evaluation unit for evaluating the captured image signals of the detector in accordance with light-field technology is present. The invention additionally relates to a method for microscopic image generation.

17 Claims, 7 Drawing Sheets

(56) References Cited

U.S. PATENT DOCUMENTS

2022/0026695 A1* 1/2022 Mahecic ............ G02B 27/0961
2023/0138764 A1* 5/2023 Truong ................ G02B 21/248
                                                                                                      359/374

* cited by examiner

MICROSCOPE AND METHOD FOR MICROSCOPIC IMAGE RECORDING WITH VARIABLE ILLUMINATION

RELATED APPLICATIONS

The present application claims priority benefit of German Application No. DE 10 2020 209 889.1 filed on Aug. 5, 2020, the contents of which are incorporated by reference in their entirety.

FIELD OF THE INVENTION

The invention relates to a microscope according to a method for microscopic image recording with settable variable illumination having the features and characterizations as set forth in the appended claims.

BACKGROUND OF THE INVENTION

Over the past decades, the life sciences have been increasingly focused on studying thick tissue structures up to entire animals. This is driven not least by the aging of our society and the resulting increase in the frequency of cerebral diseases, such as dementia and Parkinson's disease, and the interest in researching them.

In order to understand the underlying mechanisms of these diseases, active brains are observed quasi during "thinking". In this respect, large volumes of cerebral tissue are examined and the interaction, link and stimulus conduction between the cells of a neural network are studied. Consequently, three-dimensionally resolved image data must be recorded within the shortest possible time, wherein the volumes observed have dimensions of, for example, 1000×1000×100 μm or even larger. In order to be able to image such large volumes within a short period of time, frequently a lower resolution is tolerated.

Methods of three-dimensional imaging known from the prior art are, for example, confocal laser scanning microscopy (LSM) and its modifications. In these methods, very high-contrast image stacks with great background suppression are generated due to optical sectioning by means of spatial filtering at a confocal pinhole stop. However, the sequentially scanning image recording results in a very low frame rate. Confocal microscopy permits the acquisition of samples having a thickness of 100 μm and more.

If even thicker samples are to be examined, multiphoton excitation can be applied. Due to the reduced scattering cross section of the near-infrared excitation light, multiphoton excitation still allows the formation of a compact focus even at greater tissue depths. This method also sequentially scans the sample volume, but of tissue thicknesses of up to approximately 1 mm.

When using spinning disk microscopy, by contrast, the sample is scanned with approximately 1000 image points (spots) at the same time by directing the excitation light that is focused through a rotating pinhole disk into the sample. Emitted fluorescence excited in the sample is in turn imaged through the pinhole of the pinhole disk onto a camera. For large sample thicknesses (>30 μm), spinning disk microscopy exhibits a tendency toward crosstalk between adjacent pinholes, meaning that the quality of background suppression decreases in thick samples.

In light sheet microscopy, line illumination generated with cylindrical optical units is generally incident on the sample orthogonally to the detection direction, with the result that the detection objective is looking onto an illuminated surface into the focus plane thereof. The thickness of the light sheet determines the optical sectioning and thus the background suppression. The detection is a pure widefield arrangement. The achievable frame rate is determined by the camera, and the volume rate is dependent on the speed at which the sample can be moved through the focus plane of the detection objective.

Inspired by light sheet microscopy, the light sheet in oblique plane microscopy (OPM; for example U.S. Pat. No. 9,638,909 B2) and in swept confocally aligned planar excitation microscopy (SCAPE; e.g. WO 2008/078 083 A1) is incident on the edge region of an objective serving as the illumination and detection objective. In this variant of microscopy, only one objective is required for illumination and detection, which paves the way for the general utilization for all samples.

In the SCAPE method, a substantially aberration-free copy of the sample is generated in an intermediate image by means of non-magnified imaging of the fluorescence. Using a further detection objective, this copy of the light sheet, which is incident at an incline, is viewed orthogonally. In order to generate a z-stack, the inclined light sheet is scanned laterally through the sample. In principle, this system can also capture large sample volumes at high speeds. However, disadvantages are the enormous amount of apparatus required and also the fact that it is not possible to utilize the full numerical aperture (NA) for detecting the fluorescence. In this way, valuable fluorescence photons are lost. In addition, changing an objective in OPM and SCAPE is possible only with difficulty because the objective at the sample level and the objective at the intermediate image should be matched to one another or even be identical.

In contrast to the methods OPM and SCAPE, the full detection NA is used according to a method known from WO 2015/124648 A1 by way of detection taking place by means of cubic phase masks, axicon lenses or microlens arrays (application of light-field technology) having an extended depth of field (EDOF). For example, in a method disclosed in WO 2015/124648 A1, the inclined thin light sheet is scanned laterally. By utilizing the knowledge of the position thereof, a three-dimensional model of the sample is computed. Here, EDOF detection can be used, as can be realized for example using an axicon in the detection beam path. If, on the other hand, the detection is realized based on a light-field approach, it is possible to algorithmically reconstruct therefrom a three-dimensional volume. Additionally, the position of the rather thin light sheet can be taken into account, as a result of which it is possible to increase the axial resolution and to bring about effective discrimination of the background.

By contrast, in a method referred to as selective volume imaging microscopy (SVIM), a possibly inclined but thick light sheet is generated and used to suppress only the off-focus background. The sample volume is illuminated substantially instantaneously, so that scanning is hardly necessary anymore. The three-dimensional image information is ascertained by way of light-field calculation.

SUMMARY OF THE INVENTION

The invention is based on the object of proposing an apparatus by means of which, in addition to the generation of an inclined light sheet, different illumination modes can optionally be realized. It is an additional object of the invention to propose a method for microscopic image generation, in which different illumination modes can optionally be generated and applied.

The object is achieved by a microscope in accordance with and by a method in accordance with the claims annexed hereto. The dependent claims specify particular advantageous developments of the invention.

The microscope has an excitation beam path for guiding excitation light. The excitation beam path comprises a laser light source for providing a laser light beam as excitation light and a scanning apparatus for setting an angle of incidence of a focused laser light beam into a laser focus in the objective pupil, also referred to as entrance pupil, of an objective acting as the illumination objective. The laser focus is here directed into an entrance point that is radially offset with respect to the optical axis of the illumination objective. The result of this is an (inclined) light beam that is oblique with respect to the optical axis of the objective. The oblique orientation is here substantially dependent on the radial distance of the entrance point from the optical axis. The direction of the inclined light beam is determined substantially by the relative angular position of the entrance point. In order to generate a light sheet, the angle of incidence can be changed, for example can be moved quickly back and forth (scanned) within a defined angular range. Alternatively, it is already incident on the entrance pupil, which brings about a light sheet on the object side, in one manifestation.

The microscope furthermore has a detection beam path for guiding detection light. Said detection beam path comprises a microlens array having a focal plane. Due to the effect of the microlens array, a plurality of partial imaged presentations, which can be captured with a spatially resolved detector that is arranged there, are imaged into the focal plane. The microscope additionally has an evaluation unit, which is configured for evaluating the captured image signals of the detector in accordance with light-field technology. That is to say that the evaluation takes place on the basis of and taking into consideration spatial information and angle information of the light beams that are captured per detector element (pixel) of the detector.

According to the invention, the microscope is characterized in that a controllable means for setting the intensity distribution in an objective pupil (from here on also: entrance pupil) is arranged in the excitation beam path between the laser light source and the scanner. For this purpose, for example, the phase distribution of the laser light, that is to say the intensity and the, in particular transverse, phase (phase distribution), is influenced in a targeted manner. Owing to the ability to set the phase distribution, a resulting intensity distribution and a respective entrance point of the laser light beam in the entrance pupil can be set.

The core of the invention is the creation of a feature by means of which the excitation light in the excitation beam path can be modified in a targeted manner and, due to the effect of the modified excitation light, the spatial and/or temporal manifestation of a light beam or light sheet that is to irradiate the sample is settable. The generation of at least one inclined light sheet combined with the evaluation of the captured detection light according to the principles of light-field technology in this case has an advantageous effect.

The microlens array can be arranged in an image plane or in a plane that is conjugate to the entrance pupil of the detection objective (Fourier light-field technology).

In (Fourier) light-field technology, the detection light is divided into a multiplicity of partial imaged presentations by means of the microlens array. Each of the microlenses optically acts like an individual sub-aperture and in the process generates an imaged presentation of the sample using a part of the angular spectrum that is assigned thereto. The sample is thus viewed from different viewing directions. The image points brought about by the sub-apertures are different from their adjacent image points and are individually captured by means of the detector elements of the detector. This has the advantage of imaging the sample volume without artefacts on the detector. Subsequently, the multiplicity of image points are included in a calculation, wherein the many individual pieces of information allow a computational generation, optionally of a two-dimensional or three-dimensional imaged presentation. It is finally possible to perform a back-calculation of an imaged presentation of the sample volume from the resulting parallax.

The detector can have a two-dimensional chip with detector elements, for example a CCD chip, a CMOS, an sCMOS chip or a SPAD (single photon avalanche diode) array. The detector can furthermore be suitable for carrying out FLIM (fluorescence lifetime imaging microscopy) examinations. A microscope according to the invention can have a plurality of detectors, which may be arranged in a common or in separate detection channels. It is also possible for a detector to be designed for capturing different image data, for example image data that are based on different locations or wavelengths. For example, the detection surface of the detector can be physically and/or functionally divided such that the different image data are captured in each case by a portion of the detector elements that is intended therefor (the portions should likewise be considered to be detection channels). The detection channels can contain spatially, temporally and/or spectrally different image data.

The detection light is excited in particular by providing the sample with light-emitting markers, in particular with fluorescence markers. Due to the effect of the wavelength or wavelengths of the excitation light that is matched to the markers that are to be respectively excited, the illuminated markers are excited to emit for example fluorescence radiation as the detection light.

Of central importance for the invention is the controllable means, arranged in the excitation beam path, for setting the phase distribution of the laser light beam and the intensity distribution thereof in the entrance pupil. This means may be a light modulator (spatial light modulator; SLM) for example in the form of a phase SLM or a liquid crystal on a silicon substrate (liquid crystal on silicon; LCOS). The controllable means can furthermore comprise nematic liquid crystals, a micromirror array (digital (micro)mirror device; DMD) or a micro-electromechanical system (MEMS). For the purpose of simplification, the means for setting the phase distribution of the laser light beam and the intensity distribution thereof in the entrance pupil will also be referred to below as SLM.

The manipulation of the phase distribution of the excitation light and the intensity distribution in the entrance pupil determines at least one parameter of the light distribution in the entrance pupil, such as for example the position of the entrance point of the excitation light, the diameter and/or the cross-sectional shape of the beam bundle of the excitation light. An aspect ratio of the light distribution and/or the number of the simultaneously used entrance points can likewise be determined thereby.

In order to allow the set phase distribution to act on the sample that is to be imaged, the scanning apparatus is arranged in a focal plane of an imaging optical unit. The light distribution on the scanning apparatus, that is to say in a scanner plane, is brought about by the phase distribution that is set by means of the SLM. The SLM and the objective pupil are related by way of a Fourier transform. In this way, different illumination modalities and intensity distributions in the pupil plane of the objective (entrance pupil) and thus also in the sample can be realized by way of setting a phase distribution at the SLM. A resulting intensity distribution in the entrance pupil is achieved by way of the effect of the SLM or by way of a combination of the effects of the SLM and the scanning apparatus.

In addition to the evaluation unit, the microscope advantageously comprises a control unit, both of which can be designed for example in the form of a computer each or in the form of compartments of one computer. The control unit is used to generate control commands with which, for example, the SLM and the scanning apparatus and also optionally the detector or the detectors can be controlled. For example, the control unit is used to trigger the detector to the illumination, that is to say to the scanning apparatus and SLM. A change in the illumination situation, for example new control of the scanner and/or a new setting of the phase distribution of the SLM, can bring about a new image recording. The individual images recorded by the camera are converted to image stacks within the meaning of the light-field technology by means of the correspondingly configured evaluation unit. The evaluation unit is connected to the control unit in a way that is suitable for transmitting data.

In a preferred embodiment of the microscope according to the invention, an existing objective serves both as the illumination objective for illuminating a sample that is to be imaged and also as the detection objective for capturing detection light. In such a configuration, only one objective is required, resulting in savings both in terms of costs and also installation space. The further explanations of the invention relate, by way of example, to such an objective.

As explained above, the individual angular spectra of the respective micro-lenses allow a computational two-dimensional and/or three-dimensional reconstruction of the sample. In order to obtain the full depth information therefor, the actual diameter of full illumination in the plane of the microlens array should be adapted to the size of the detector. The size of the camera chip therefore determines the maximally utilizable diameter of the illumination in the plane of the microlens array.

This may mean that, after a change of the (detection) objective, the magnification scale of the imaging optical unit, more generally of the detection beam path, must be adapted in order to generate a plane that is conjugate to the objective pupil. An adaptation can, in a further embodiment of the microscope according to the invention, be implemented by way of a means for setting a magnification scale for example of the detection objective or of the objective in the detection beam path. Such means can be, for example, a zoom optical unit or an interchangeable telescope. Without such a means for setting a magnification scale, the optimum and loss-free use of the system of the microscope would be limited to one objective class (e.g. 40×/NA 1.2; 20×/NA 0.6; ... ) having a constant ratio of magnification and numerical aperture.

Since interchanging the detection objective, for example, can be associated with an axial displacement of the entrance pupil, a focal-length-variable imaging optical unit, which is designed for setting the transfer length of the imaging of the entrance pupil of the detection objective into the plane of the microlens array, is present in the detection beam path in one possible advantageous embodiment of the microscope according to the invention. Such a variable optical unit therefore serves for displacing the axial position of a plane that is conjugate to the entrance pupil into the position of the microlens array.

The invention can be used with a plurality of wavelengths of the excitation light and of the detection light. In one possible embodiment, excitation light having two or more excitation wavelengths is directed into the entrance pupil of the objective at respectively different angles of incidence in order to achieve color-selective detection. Due to the individual angles of incidence, the resulting light beams or the light sheets generated with said light beams illuminate spatially separated sample regions. After two-dimensional light-field raw data of the different light sheets have been captured, a three-dimensional dataset is mathematically generated from said raw data. Even if the emission of the markers that are excitable with the at least two excitation wavelengths spatially overlap one another in some partial images of the light-field raw data, the detection light is, in the final result, nevertheless spatially separated by markers and can therefore be easily cut and sorted into data stacks, which are assigned to the respective markers. Optionally, a barrier filter for back-scattered excitation light can be arranged in the detection beam path.

In one possible embodiment of a microscope according to the invention, laser light having a plurality of wavelengths is provided in the excitation beam path by way of the correspondingly designed laser light source. Alternatively, at least two laser light sources can be present for providing laser light of different wavelengths. Owing to the effect of the SLM, laser light having the respective wavelengths is directed at respectively different angles of incidence into the laser focus in the entrance pupil. In the detection beam path, captured detection light brought about by the effect of the laser light of the respective wavelengths is captured separately on spatially different detector surfaces of a detector or on a plurality of detectors.

In alternative embodiments, at least one means for splitting captured detection light over a plurality of detection channels may be present in the detection beam path. In one corresponding possible embodiment, the detection light can be divided over different detection beam paths (detection channels) for example by means of at least one dichroic splitter, which may be present in addition to a main color splitter, and be captured by respectively separate detectors or by spatially different detector surfaces of a detector. Such an embodiment has the advantage that the image coverage of both channels is achieved without overscanning the image field. Such embodiments can again be provided with microlens arrays in front of the respective detectors. Alternative embodiments can also be implemented without microlens array, in that the color splitting does not take place until after the microlens array arranged conjugate to the objective pupil and is imaged accordingly onto the detectors or onto regions of a detector that are provided therefor.

The method for microscopic image generation, which is likewise proposed to achieve the object, can be carried out using a microscope according to the invention. In the method, laser light of at least one wavelength from a laser light source is directed and focused, as excitation light, along an excitation beam path. A light-directing element, for example a scanning apparatus, is used to direct the focused laser light beam into the entrance pupil (objective pupil) of the objective. The laser focus is here directed into an entrance point in the entrance pupil that is radially offset with respect to the optical axis of the objective.

Detection light coming from a sample illuminated with the laser light is captured and directed along a detection beam path onto a microlens array. The microlens array can here be arranged in or near a pupil that is conjugate to the objective pupil, for example of a detection objective. In further embodiments of the invention, the microlens array is arranged in an intermediate image plane that is substantially optically conjugate to the object. The microlens array has a focal plane for generating partial imaged presentations, as was already explained above. The partial imaged presentations generated in the focal plane are detected and evaluated on the basis of spatial information and angle information of the light beams that have been captured per detection element of the detector.

The method is characterized in that the phase distribution of the laser light beam and an intensity distribution resulting therefrom in the excitation beam path is influenced in the entrance pupil in a targeted manner, or in that the presence of a necessary influencing of the phase distribution and of the resulting intensity distribution is checked.

A check can be performed for example if the configuration of the optical apparatus used so far, in particular of a microscope, is known and the configuration is changed. For example, the wavelength of the excitation light used, a magnification scale of the detection beam path and/or a pattern of the scanning of a sample can be changed by way of the excitation light shaped by means of the illumination objective. The check can additionally or alternatively be directed at a comparison of the actually achieved effect of the influenced phase distribution with a desired effect. A result of the check can be used to control for example the means influencing the phase distribution in the sense of a feedback control system.

The excitation light beam that has been directed outside the optical axis into an entrance point into the entrance pupil emerges from the (illumination) objective on the object side obliquely with respect to the optical axis, with the result that the beam path thereof correspondingly extends obliquely with respect to the optical axis. The oblique orientation depends on the extent of the radial distance of the entrance point from the optical axis, that is to say on the point at which the radiation point is located on a radius directed from the optical axis to the edge of the entrance pupil.

In order to generate an inclined light sheet on the object side, the angle of incidence of the laser beam can be changed substantially perpendicular to the radius. The light beam is consequently displaced in a direction perpendicular to the radius while maintaining the inclined orientation, and the illumination point in the object plane changes accordingly. If the respective angle of incidence is changed with sufficient speed and preferably repeatedly, an inclined light sheet is generated on the object side.

In an alternative configuration of the method, the laser focus is incident on the entrance pupil as a line-shaped light distribution, so that a light sheet that is oriented obliquely with respect to the optical axis of the objective is generated on the object side of the objective. The line-shaped light distribution extends substantially along a section of a radius of the entrance pupil. If the line-shaped light distribution has a longitudinal-oval shape, the major axis of the two main axes of the oval lies substantially along a radius. An advantage of this configuration is that it is not necessary to change the angle of incidence in the focus point in the entrance pupil in order to generate the inclined light sheet. The duty cycle of the illumination is significantly improved thereby.

The advantage of the illumination with a light sheet is that the layer of the sample is illuminated only thinly at a time and that the bleaching outside the light sheet is consequently avoided. In order to be able to successively capture larger regions of the sample with the light sheet, it is possible, in addition to changing the angle of incidence of the laser focus in the entrance pupil transversely to the radius, to also change the angle of incidence in the radial direction. Using a corresponding control of the SLM and a resulting change in the phase position of the laser light, it is thus also possible to set the thickness of a light sheet. Depending on the configuration of the method, it is also possible to change the position of the entrance point of the laser focus, shaped as a line-shaped light distribution, in the radial direction. The changes in position take place in particular in a step-wise fashion and after image recording has ended. It is therefore possible by means of a microscope according to the invention to adapt the thickness of the light sheets generated to the desired application. The thickness can here correspond to a "classic" thin light sheet. It is also possible to generate light sheets that are thicker than typical light sheets and illuminate a correspondingly large volume.

In a further configuration of the method according to the invention, it is possible in an illumination situation to have more than one laser focus, in particular two laser foci, incident on the entrance pupil, in particular in the form of in each case one line-shaped light distribution (hereinafter also: line illumination). This plurality of laser foci that are incident will also be referred to below as "irradiation pattern". As a result of the application of such an irradiation pattern, a corresponding number of light sheets that are oriented obliquely with respect to the optical axis of the objective are generated on the object side of the objective. If these light sheets coincide or overlap, intensity modulations due to interferences or interference structures (structured illumination patterns) occur in the overlapping regions of the light sheets.

Since the microlens array is arranged in front of the detector, the effect thereof means that the numerical aperture of the detection objective is divided. The lateral resolution of the proposed arrangement is initially therefore significantly reduced with respect to a microscope. The distance between the two line illuminations in the pupil is then selected such that the resulting intensity modulation can still just about be detected.

This should be explained briefly for the case in which the microlens array is arranged in a pupil plane. A light-field detection is effected by the pupil being divided such that a multiplicity of imaging systems with sub-images, which observe the sample at a respectively different angle, are obtained. If the line illuminations are then incident on the entrance pupil in a manner such that the respectively effected detection light arrives exactly at the edge of one of said microlenses in the pupil, the spatial frequency of the resulting interference structure can still just about be detected in the sub-images. The interference structure lies at the edge of the resolution limit for the imaging system in question, but not for the detection objective itself.

Optionally, structuring in the axial direction can also be introduced by adding the zeroth order. The structuring can be advantageously used for the determination of the three-dimensional structure distribution owing to the parallactic view of the sample.

The incidence of an irradiation pattern over a specific period of time represents one illumination situation. Depending on the illumination situation, at least two, preferably three, different phase distributions can be used for illumination purposes. Depending on the phase distribution, detection light is detected as image data. Therefore, at least two, preferably three, images are captured per illumination situation in such a method configuration. A different entrance point is selected, for example, owing to the effect of each of the phase distributions.

This procedure can be applied in further configurations to different irradiation patterns. For example, the irradiation pattern can be changed, for example displaced and/or rotated, after the image recording with three different phase distributions in the entrance pupil. A plurality of illumination situations can be set in temporal succession, wherein the relative positions of the line-shaped light distributions of the different illumination situations are changed in each case by an absolute angle value. For example, the irradiation pattern can be rotated in each case by ±120°, that is to say can be displaced by the absolute angle value in question on a circular arc. The respectively generated illumination pattern is thus likewise rotated by 120°. With this type of structured illumination, it is necessary to record at least nine images, but it is possible to compute an image that has a better resolution by approximately a factor of 2. The compromise with respect to the reduced resolution can in this way be softened.

Alternatively, different phase distributions for the illumination lines of the irradiation pattern can be generated and radiated simultaneously. The phase distributions can be set directly by correspondingly controlling the means for setting the intensity distribution.

If structured illumination or a structured illumination pattern is generated and used, off-focus background radiation can be reduced. To this end, the illumination does not necessarily need to be structured near the limit frequency of the imaging optical unit. The two illumination patterns of the line illuminations can thus lie closer to one another. In addition, a rotation of the irradiation pattern by 120° and −120° is not necessary, which means that the background suppression can already be achieved with three image recordings. This method configuration, though, should be applied with preference in the case of particularly thick samples having thicknesses of greater than the expected depth-of-field range of a sub-aperture. Continuous modulation/demodulation also generates an equivalent effect. In the method for structured illumination, the camera needs to be triggered in a manner such that the phase structures can be clearly resolved.

In a further configuration of the method, it is possible to fully illuminate two or more regions in the entrance pupil, with the result that illuminations in the manner of light sheets are effected simultaneously in different directions. In the image evaluation in accordance with light-field technology, all views can advantageously be used.

If illumination takes place with only one light sheet, the resulting effect is that those lenses of the detection beam path that lie in the pupil region of the excitation beam path are looking in the direction of the light sheet and, in this way, in particular in the case of a rather thin light sheet, a signal is generated only along the light sheet cross section, but a large amount of backscattered light is captured.

In such a case, however, interference of the different illumination light distributions in the sample should probably be avoided. If, for example, two light sheets are generated by radiating excitation light into two opposite laser foci, interference can be avoided for example by the polarizations of the two illuminations being set such that they are perpendicular to one another in the sample.

It should be noted that such methods are for example not able to be used with SCAPE because the illumination could always be effected only in one direction. In addition to the possibilities of structuring, it is also possible to achieve optimization for further methods. For example, methods such as SOFI, STORM, dSTORM, PALM etc. can also be performed with the proposed microscope in a light-field approach. For these methods, a light sheet that is as narrow as possible is necessary, although said light sheet is required to fully illuminate only a relatively small region. Owing to the localization, it is likewise possible to significantly increase the resolution.

With the proposed microscope, a large number of complex illumination patterns for a wide variety of applications can be realized. In particular, the illumination intensity distribution can also be apodized in the entrance plane of the objective, for example in order to generate a light sheet without secondary maxima.

The method can be performed with a plurality of colors simultaneously. Color-selective detection may then optionally be performed. Furthermore, both a linear and a non-linear generation of the fluorescence can be effected by means of multiphoton effect.

Advantages of the invention are, for example, the possibilities of being able to generate a large number of illumination patterns and to adapt them to a large number of objectives. Here, the entire numerical aperture is available for the detection. One advantage is therefore a flexible setting of the illumination of the sample that allows a large number of different direction strategies. The method may be carried out with a large number of further established microscopy methods simultaneously or quasi-simultaneously on a stand, and optionally without an objective.

BRIEF DESCRIPTION OF THE DRAWINGS

The invention is explained in more detail below on the basis of exemplary embodiments and figures. In the figures.

DETAILED DESCRIPTION OF THE EMBODIMENTS OF THE INVENTION

Figure 1:
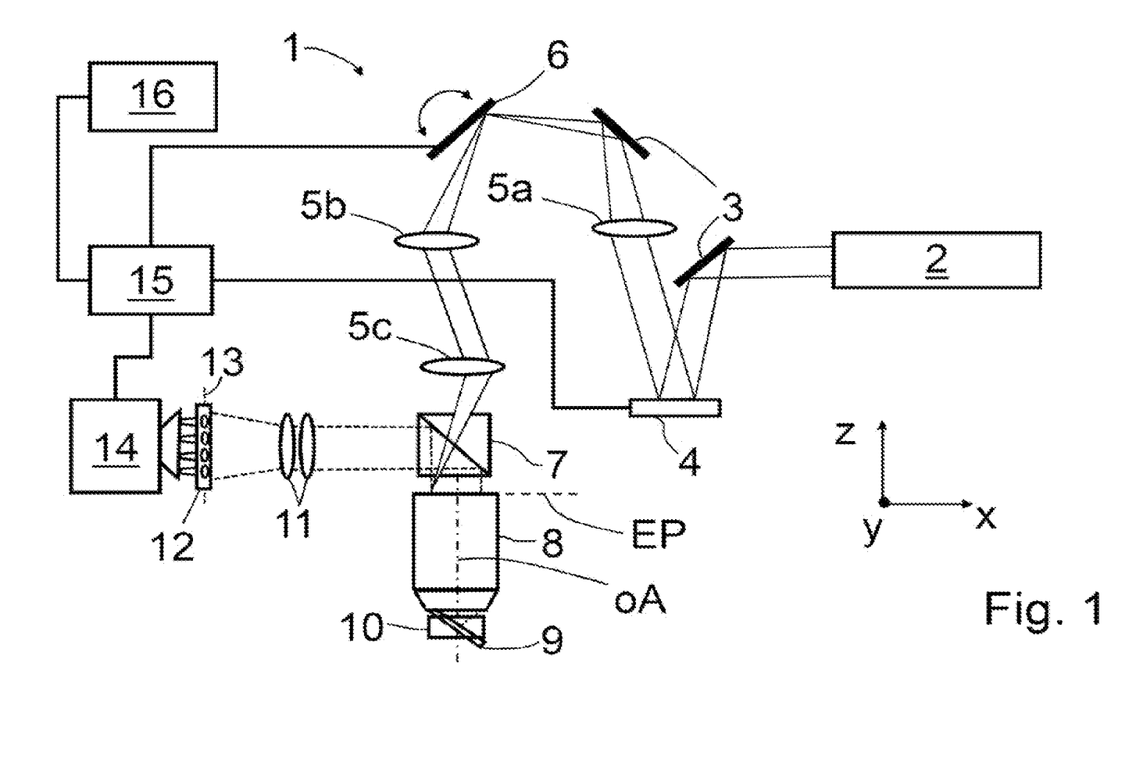
FIG. 1 is a schematic illustration of a first exemplary embodiment of a microscope according to the invention.

In a first exemplary embodiment of the apparatus according to the invention in the form of a microscope 1, a laser light source 2 for providing laser light as excitation light, a mirror 3, a controllable means for setting the phase distribution 4 (SLM 4), optical lenses 5a, 5b, 5c, a light-directing device 6 or scanning apparatus 6 (also: scanner 6), a color splitter 7 and an objective 8, acting as illumination objective, having an entrance pupil EP are present in an excitation beam path (FIG. 1). The Cartesian coordinate system used in FIGS. 1 and 2 accordingly also applies to the illustrations in FIGS. 3 to 8c.

A telescope 11, a microlens array 12 in a plane 13 that is conjugate to the entrance pupil EP, and a detector 14 in the form of a spatially resolving camera are present in a detection beam path (symbolized by way of broken full lines). The detector 14 is connected to a control unit 15 in a manner that is suitable for exchanging data. The control unit 15 is in turn connected to an evaluation unit 16. The control unit 15 can be used to generate control commands, which serve for controlling the means for setting the phase distribution 4 (hereinafter also phase SLM 4 or SLM 4 for short) and the scanning apparatus 6. The control unit 15 is connected to the technical elements to be controlled. The evaluation unit 16 is configured for evaluating and further preparing the image data.

During the operation of the apparatus according to the invention, in particular of the microscope 1, laser light emitted by the laser light source 2 is directed onto the SLM 4 by means of the mirror 3. If necessary, an optional beam-expanding optical unit (not shown) is situated between the laser light source 2 and the SLM 4 in order to illuminate a sufficient number of SLM pixels. Depending on the control state of the SLM 4, the incident laser light is influenced with respect to its phase distribution and reflected as influenced excitation light. The influenced excitation light (laser light) is focused by means of the optical lens 5a, which effects a Fourier transform of the pattern of the phase distribution that is imprinted on the laser light. The laser light passes to the scanner 6 via one or more further mirrors 3. The scanner 6, which is controlled by the control unit 15, deflects the laser light in an x-direction x and/or in a y-direction y. The scanner 6 can be used to vary the angle of incidence of the excitation light in an entrance point in the entrance pupil EP (objective pupil). The entrance point is determined by the phase distribution that was imprinted on the influenced excitation light through the effect of the SLM 4. The scanner 6 is arranged conjugate to the entrance pupil EP. The SLM 4 is located in a plane that has a relationship described by way of a Fourier transform with the entrance pupil EP and the scanner 6.

As will be explained in more detail below, the excitation light is directed, after it has passed through a scanner lens 5b, a tube lens 5c and the dichroic color splitter 7, into an entrance point in the entrance pupil EP that is located outside of the optical axis oA of the objective 8. As a result, a light sheet 9 which is inclined with respect to the optical axis oA is generated on the object side by way of the objective 8. If a sample 10 is located in a sample space in front of the objective 8, the light sheet 9 can be directed into said sample.

Owing to the effect of the light sheet 9, which is formed from the excitation light, fluorescence can be excited in the sample and be emitted as detection light. Emitted detection light is captured using the objective 8, which serves both as the illumination objective and as the detection objective. Owing to the effect of the color splitter 7, the detection light, which has a longer wavelength than the excitation light, is reflected into the further progression of the detection beam path and travels via the telescope 11 to the microlens array 12. The microlenses, which are shown by indication, in each case act as sub-apertures and can be considered to be individual imaging systems. The image points brought about by the individual sub-apertures are captured, in the form of image data, by correspondingly positioned detector elements of the detector 14 and transmitted to the control unit 15 and the evaluation unit 16.

Figure 2:
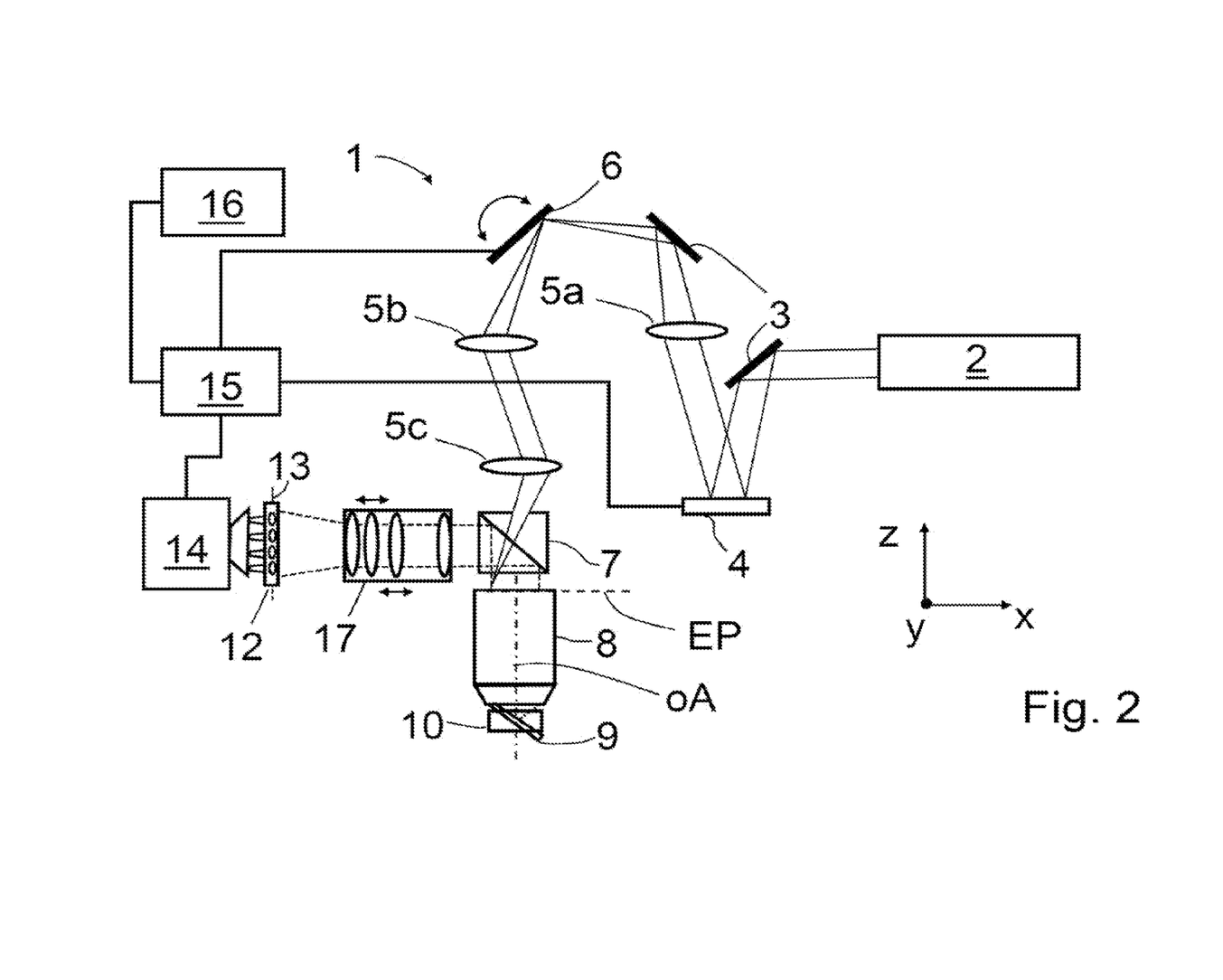
FIG. 2 is a schematic illustration of a second exemplary embodiment of a microscope according to the invention.

FIG. 2 shows a second exemplary embodiment of the microscope 1. A variable optical unit 17 (focal-length-variable imaging optical unit 17) is arranged in the detection beam path. This can be a zoom optical unit, as schematically shown in FIG. 2, with which a magnification scale of the detection beam path can be set. In a further embodiment of the microscope 1, the variable optical unit 17 can be an optical unit for setting the axial position of a plane that is conjugate to the entrance pupil EP. Since the axial position of the entrance pupil EP can vary in the case of an objective change, it is advantageous to be able to correspondingly displace the plane that is conjugate thereto into the position of the microlens array 12.

FIGS. 3 to 8c in each case show simplified illustrations of the objective 8, a top view of the entrance pupil EP and the light sheet 9, which is brought about by way of the respective illumination situation. In addition to the objective 8, the figures (except for FIGS. 8b and 8c) in each case show top views of the illuminations effected in the sample 10 in an xy-plane and generated light sheets 9 in an xz-plane.

Figure 3:
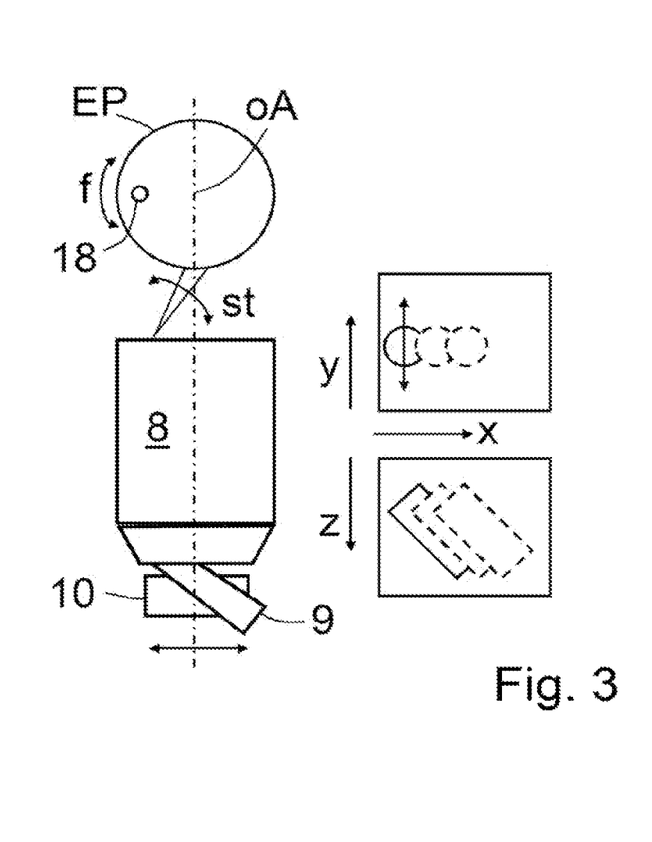
FIG. 3 is a schematic illustration of a first exemplary embodiment of a configuration of the method according to the invention.

The application of the selective volume imaging microscopy (SVIM), which is settable with the microscope 1 according to the invention, is shown in FIG. 3. Owing to the effect of the SLM 4 (see FIGS. 1 and 2), in the entrance pupil EP, excitation light is incident, in the form of a small laser focus 18 (spot), in an entrance point outside of the optical axis oA. The positioning of said laser focus 18 at the edge of the entrance pupil EP results in an inclined beam path of the laser light. In addition, the light distribution in the sample 10 is significantly expanded. If the angle of incidence of the laser focus 18 is changed quickly (denoted by: f) and repeatedly along the y-direction by means of the scanner 6,—and the inclined beam path of the laser light is thereby quasi moved back and forth (scanned)—a light sheet 9 (outlined with a full line) is obtained over a time average. Owing to the expanded light distribution, the light sheet 9 is correspondingly thick.

In order to fully illuminate the entire region of interest of the sample 10 during the integration time of the detector 14 or in successive individual image recordings, which are triggered to the positioning of the light sheet 9, a set of positions is accordingly selected in the x-direction x (denoted by: st). For this purpose, the angle of incidence of the laser focus 18 in the entrance pupil EP is correspondingly adapted. The positions of the generated light beams or of the generated light sheets 9 with respect to one another are preferably equidistant so as to permit uniform illumination and simple evaluation of the image data. By way of example, FIG. 3 shows two further illumination situations by way of the illuminations or light sheets 9, which are bounded by broken full lines. Different positioning can also be achieved by correspondingly displacing the sample 10 transversely to the optical axis oA.

Figure 4:
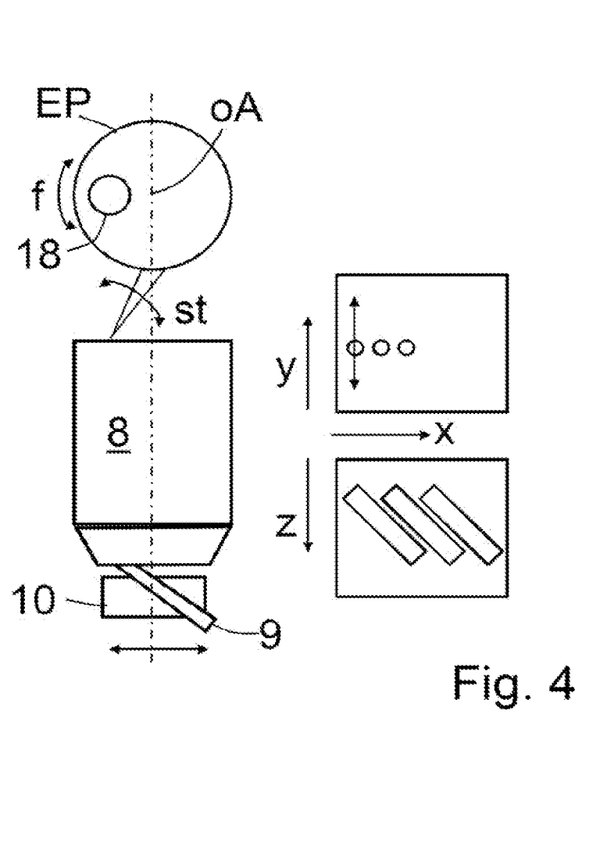
FIG. 4 is a schematic illustration of a second exemplary embodiment of a configuration of the method according to the invention.

FIG. 4 depicts a second configuration of the method according to the invention. The laser focus 18 in the entrance pupil EP is relatively large, whereas the beam bundle that is incident on the sample 10 is correspondingly narrow. A light sheet 9 is again generated by a quick scan (change in angle of incidence) along the y-direction. The number of the positions or supporting points to be selected laterally (radially) must then be increased in order to achieve full illumination of the sample. The time required for recording the image data therefore increases. However, in return, the contrast of the image data is improved because the narrower light sheet 9 effects better background suppression. Generally, the detector 14 (see FIGS. 1 and 2) is triggered here such that a recording is made when each lateral position of the light sheet 9 is reached. If the light sheet 9 is sufficiently thin, a further increase in background discrimination can be attained.

FIGS. 3 and 4 in each case show a plurality of light sheets 9 in the sample space. This means that multiple positions of the light sheet 9 can be selected temporally successively by means of the microscope 1 according to the invention. In addition, it is possible with the microscope 1 according to the invention to simultaneously generate a stack of light sheets 9 in the manner shown in FIG. 5. For this purpose, excitation light is incident on the entrance pupil EP at a plurality of entrance angles simultaneously. The large diameter of the laser foci 18 produces in the xy-plane in each case one small illumination spot. If the laser foci 18 are scanned in the y-direction, correspondingly narrow light sheets 9 are formed in the xz-plane.

Figure 5:
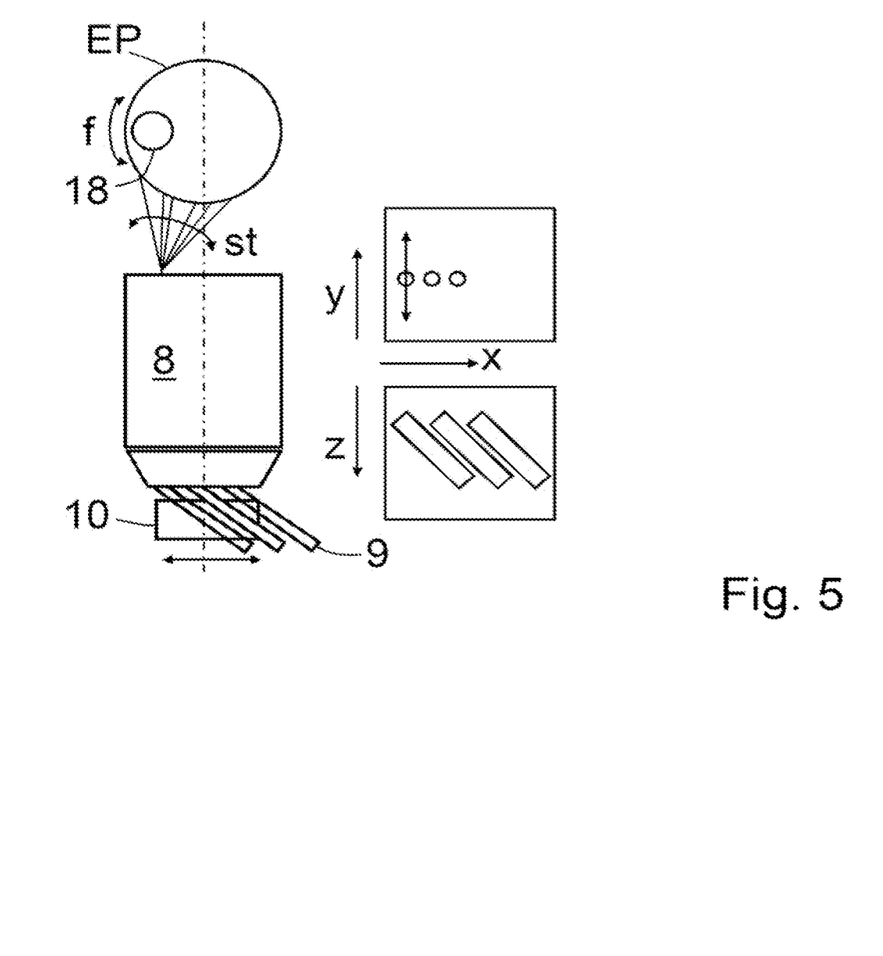
FIG. 5 is a schematic illustration of a third exemplary embodiment of a configuration of the method according to the invention.

This method configuration has the advantage that well defined 3D point spread functions (PSF) are obtained owing to the combination of the 3D effect in the detection with a respectively locally limited excitation. If the sample 10 to be imaged is optically too thick or scatters too much, the number of the simultaneously generated light sheets 9 must be reduced and, in the limiting case, be limited to one scanned light sheet 9.

Figure 6A:
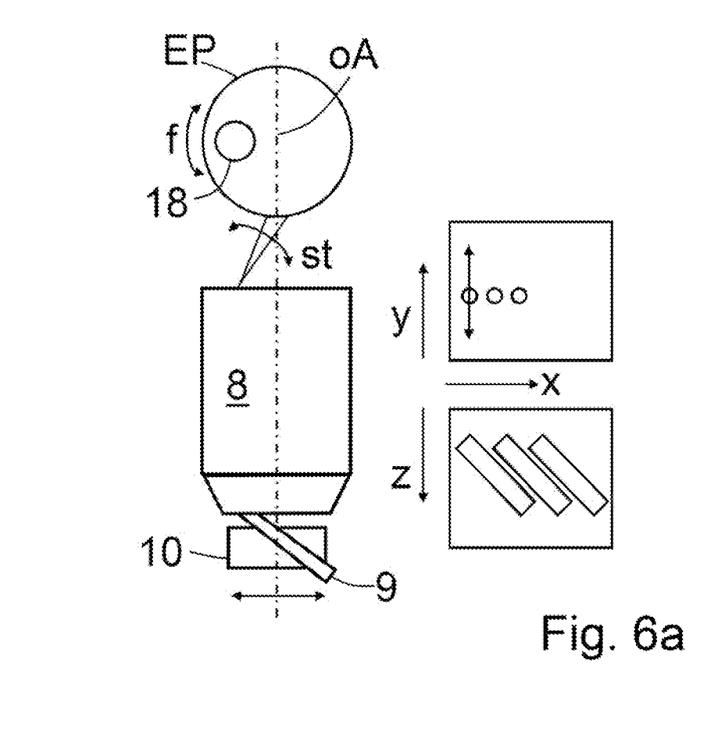
FIG. 6a is a schematic illustration of a fourth exemplary embodiment of a configuration of the method according to the invention.
Figure 6B:
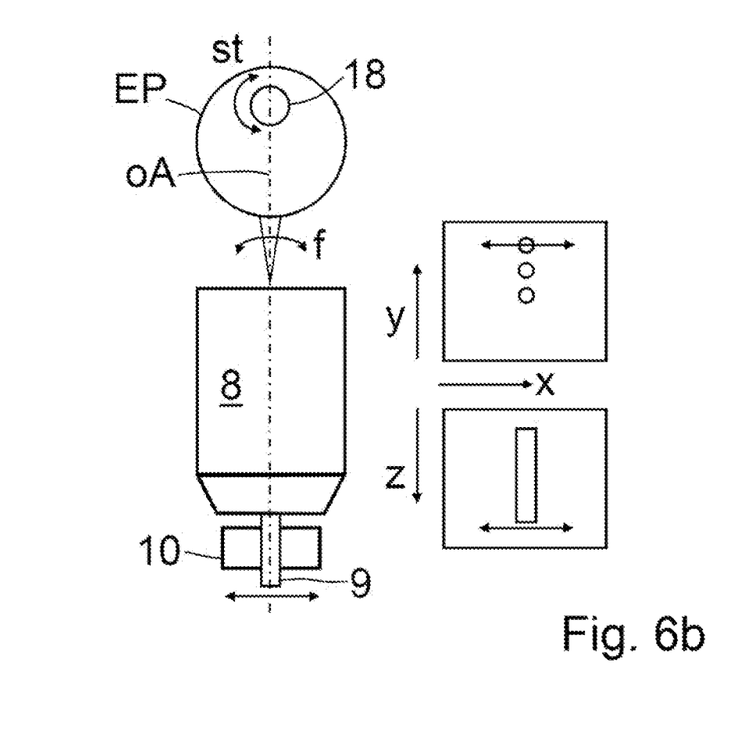
FIG. 6b is a schematic illustration of the fourth exemplary embodiment of a configuration of the method according to the invention.

As a result of the inclined illumination, the full illumination of the sample 10 can vary across the field of view. This can be reduced by recording and computing a plurality of images with different illumination geometries. FIGS. 6a and 6b show this procedure by way of example. FIG. 6a shows illumination situations as described with respect to FIG. 4. A plurality of regions of the sample 10 illuminated with the light sheet 9 are produced in a time-sequential manner. The positioning is effected such that the illuminated regions do not overlap.

The illumination geometry can be changed for example as shown in FIG. 6b. The laser focus 18 is displaced with respect to the position in FIG. 6a by 90° on a circular arc. Again, a plurality of entrance angles of the laser focus 18 are set, and an image is captured in each case.

If necessary, the scanning geometry must be adapted in this procedure so that the change in the entrance angles must be realized by other mirrors and/or by using different pivot axes.

Figure 7A:
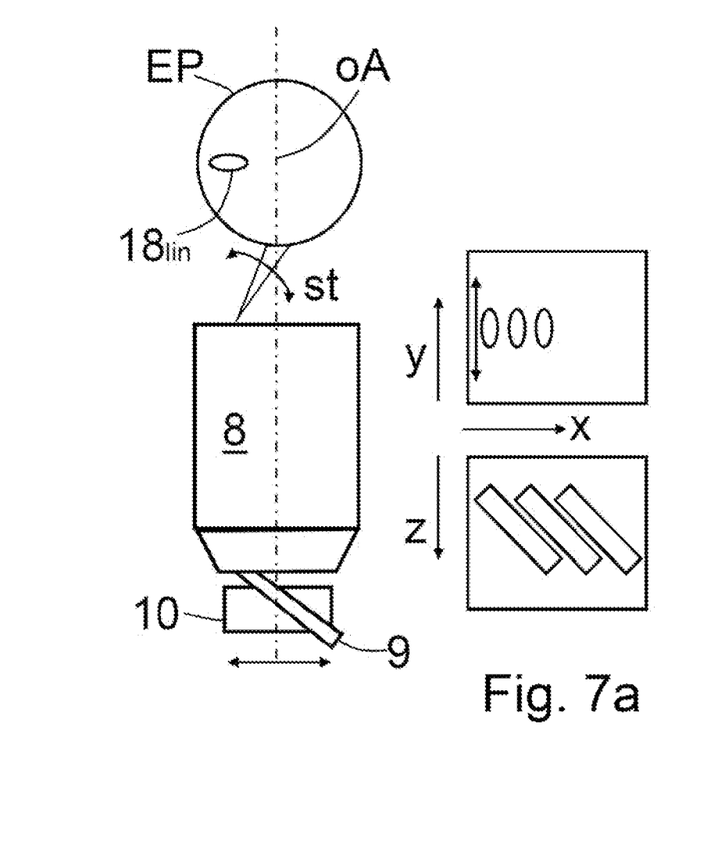
FIG. 7a is a schematic illustration of a fifth exemplary embodiment of a configuration of the method according to the invention.
Figure 7B:
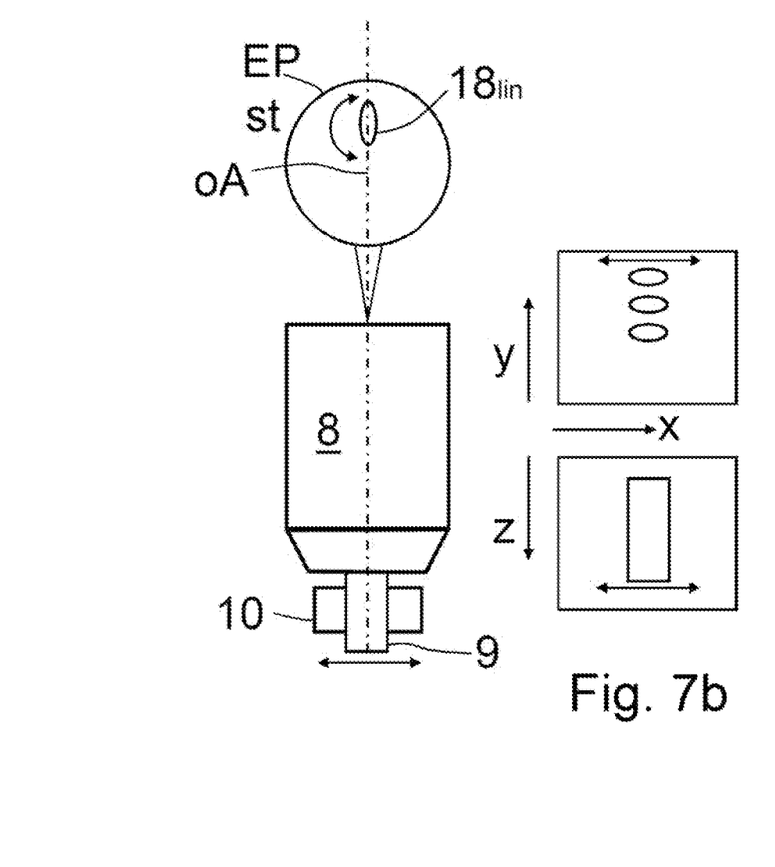
FIG. 7b is a schematic illustration of the fifth exemplary embodiment of a configuration of the method according to the invention.

A fifth exemplary embodiment of a configuration of the method according to the invention is illustrated in FIGS. 7a and 7b. The phase distribution is set in a controlled manner by way of the SLM 4 such that a line-shaped light distribution $18_{1in}$ in the entrance pupil EP is achieved (FIG. 7a). The result is the generation of a light sheet 9 on the object side, without using a scanning movement therefor. The use of a line-shaped light distribution $18_{1in}$ can be combined with the change in the illumination situations described in FIGS. 6a and 6b (FIG. 7b).

The intensities of the illumination pattern can be modulated according to a sixth exemplary embodiment. To this end, two line-shaped light distributions $18_{1in}$, which are arranged very close together in the y-direction y, are incident on the entrance pupil EP. As a result of this irradiation pattern, two light sheets 9 are produced, which overlap at least in sections of their extents. In the regions of the light sheets 9 that overlap, interference occurs, which result or can result in intensity modulations (FIG. 8a; interference symbolized by dash patterns of the illuminations in the xy-plane).

Figures 8A, 8B:
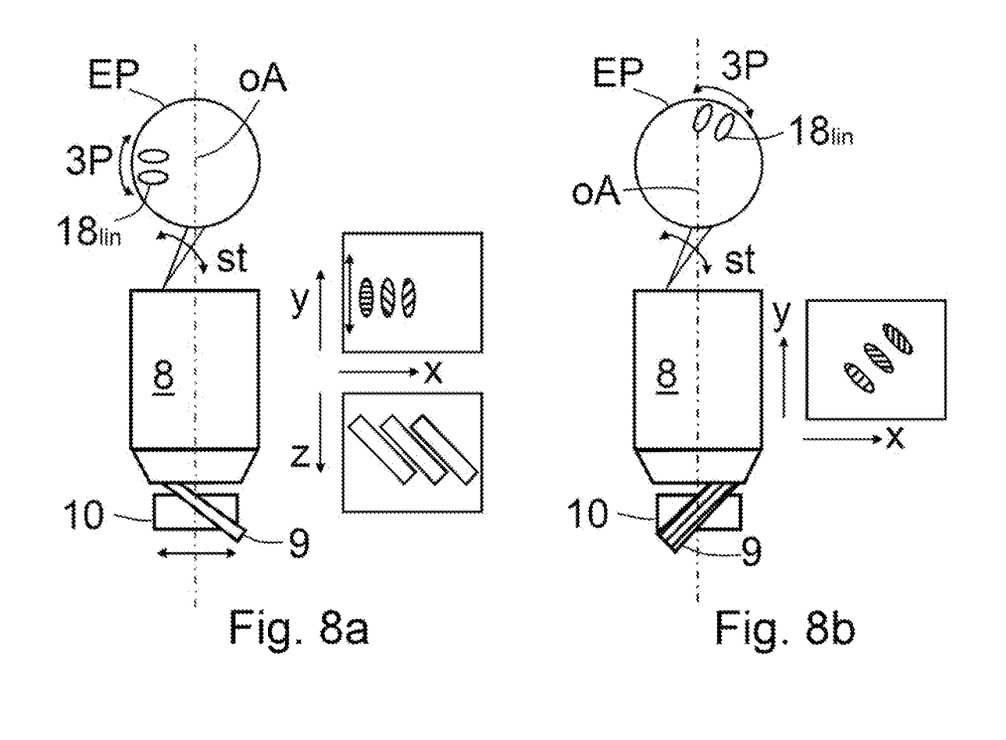
FIG. 8a is a schematic illustration of a sixth exemplary embodiment of a configuration of the method according to the invention.
FIG. 8b is a schematic illustration of the sixth exemplary embodiment of a configuration of the method according to the invention.

Each phase distribution that results in a light sheet 9 having such a structure represents one illumination situation. In FIG. 8a, two line-shaped light distributions $18_{1in}$ are directed into entrance points at an angular position of approximately 270° into the entrance pupil EP. As has already been described, it is possible to select further positions at which for each of the phase distributions or intensity distributions (denoted by: 3P) structured light sheets 9 are again produced in the xy-plane by way of a controlled setting of the phase distribution. As a result of the different phase distributions 3P thus set, a stripe structure of the light sheets 9 is generated (strip structures and their orientations are merely symbolic). In the example of FIG. 8a, three illumination situations are shown together in the illustrations of the xy-plane and the xz-plane.

Figure 8C:
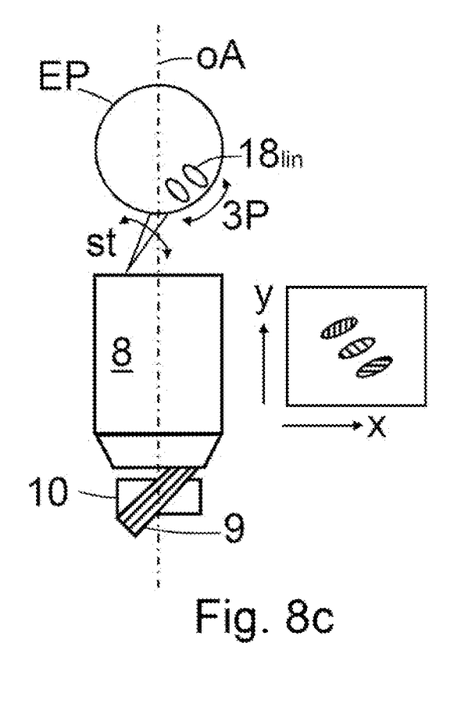
FIG. 8c is a schematic illustration of the sixth exemplary embodiment of a configuration of the method according to the invention.

FIGS. 8b and 8c show the same procedure as in FIG. 8a. Only the entrance points of the line-shaped light distributions $18_{1in}$ are displaced with respect to their angular positions on a circular arc by in each case approximately 120°. From the nine illumination situations overall, an improved three-dimensional imaged presentation of the sample 10 can be computed.

Alternatively, the phase difference between the respectively two line-shaped light distributions $18_{1in}$ can also be set directly by way of the SLM.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Microscope
2 Laser light source
3 Mirror
4 Means for setting the phase distribution (e.g. SLM)
5a Optical lens, Fourier transform lens
5b Scanner lens
5c Tube lens
6 Scanning apparatus; scanner
7 Beam splitter
8 Objective
9 Light sheet
10 Sample
11 Telescope
12 Microlens array
13 Conjugate plane
14 Detector
15 Control unit
16 Evaluation unit 17 Variable optical unit/focal-length-variable imaging optical unit
18 Laser focus $18_{1m}$ Line-shaped light distribution
oA Optical axis
EP Entrance pupil (of the objective 8)
3P Three phases
x, y, z Direction

What is claimed is:

1. Microscope for recording microscopic images, having an excitation beam path for guiding excitation light, comprising
   a laser light source for providing a laser light beam as excitation light;
   a scanning apparatus for setting an angle of incidence of a focused laser light beam into a laser focus in the entrance pupil of an illumination objective; wherein the laser focus is directed into an entrance point that is offset radially with respect to the optical axis of the illumination objective;
a detection beam path for guiding detection light, including
   a microlens array having a focal plane into which a plurality of partial imaged presentations are imaged owing to the effect of the microlens array; and
   a spatially resolved detector (camera), arranged in the focal plane of the microlens array, for capturing the partial imaged presentations as image signals,
and an evaluation unit, which is configured for evaluating the captured image signals of the detector according to light-field-technology on the basis of spatial information and angle information of the light beams that are captured per detection element of the detector,
wherein
   a controllable means for setting the phase distribution of the laser light beam and of an intensity distribution resulting therefrom is arranged in the entrance pupil in the excitation beam path between the laser light source and the scanning apparatus; and
   a respective entrance point of the laser light beam is selected or can be selected by means of the controllable means for setting the phase distribution on the basis of the respectively set phase distribution.

2. Microscope according to claim 1, wherein said illumination objective serves both as the illumination objective for illuminating a sample that is to be imaged and also as the detection objective for capturing detection light.

3. Microscope according to claim 1, further comprising means for setting a magnification scale of the detection beam path is present in the detection beam path.

4. Microscope according to claim 1, further comprising a focal-length-variable imaging optical unit in the detection beam path for setting the transfer length of the imaging of the entrance pupil of the detection objective into the plane of the microlens array.

5. Microscope according to claim 1, wherein, in the excitation beam path, the laser light source provides laser light having a plurality of wavelengths or at least two laser light sources are provided for providing laser light having different wavelengths, and at least one means for dividing captured detection light over a plurality of detection channels is present in the detection beam path.

6. Microscope according to claim 1 wherein, in the excitation beam path, the laser light source provides laser light having a plurality of wavelengths or at least two laser light sources are present for providing laser light having different wavelengths, and laser light of the respective wavelengths is directed into the laser focus at mutually differing angles of incidence due to the effect of the controllable means for setting the intensity distribution, with the result that captured detection light brought about by the effect of the laser light of the respective wavelengths is incident on spatially different detector surfaces of one or more detectors and is or can be captured separately.

7. Method for microscopic image generation, comprising
   directing and focusing a laser light of at least one wavelength from a laser light source, as excitation light, along an excitation beam path and the focused laser light beam is directed into the entrance pupil of an objective by means of a scanning apparatus; wherein the laser focus is directed into an entrance point that is offset radially with respect to the optical axis of the objective;
   detection light coming from a sample illuminated with laser light along a detection beam path onto a microlens array, wherein the microlens array has a focal plane into which a plurality of partial imaged presentations are imaged; and
   the partial imaged presentations generated in the focal plane are captured by means of at
least one detector (camera) as image signals and
   captured image signals are evaluated according to light-field-technology on the basis of spatial information and angle information of the light beams that have been captured per detection element of the detector,
wherein
   the phase distribution of the laser light beam and an intensity distribution resulting therefrom in the excitation beam path is influenced in the entrance pupil in a targeted manner, or the presence of a necessary influencing of the phase distribution and of the resulting intensity distribution is checked.

8. Method according to claim 7, further comprising repeatedly changing the angle of incidence of the laser focus in the entrance pupil along a direction perpendicular to the radial offset of the entrance point with respect to the optical axis of the detection objective such that a light sheet that is oriented obliquely with respect to the optical axis of the objective is generated on the object side of the objective.

9. Method according to claim 7, wherein the laser focus is incident on the entrance pupil as a line-shaped light distribution, so that a light sheet that is oriented obliquely with respect to the optical axis of the objective is generated on the object side of the objective.

10. Method according to claim 8, further comprising changing the radial position of the entrance point or the radial position of the entrance point of the line-shaped light distribution.

11. Method according to claim 7, wherein, in one illumination situation, more than one laser focus, in particular two laser foci, are incident on the entrance pupil in the form of in each case one line-shaped light distribution, with the result that at least two light sheets, which are oriented obliquely with respect to the optical axis of the objective are generated on the object side of the objective, wherein intensity modulations caused by interferences occur in the overlapping regions of the light sheets.

12. Method according to claim 10, further comprising using at least two different phase distributions per illumination situation for illumination purposes and detection light is detected at different phase distributions.

13. Method according to claim 9, wherein a plurality of illumination situations are set in temporal succession, wherein the relative positions of the line-shaped light distributions of the different illumination situations are changed in each case by an absolute angle value.

14. Method according to claim 7, wherein laser light having at least two mutually differing wavelengths is incident on the entrance pupil at in each case one angle of incidence, wherein the angles of incidence of the wavelengths differ from one another.

15. Method according to claim 7, further comprising capturing and computing image data of at least two different illumination situations in order to obtain a substantially full illumination of an object plane.

16. Method according to claim 10, wherein a plurality of illumination situations are set in temporal succession, wherein the relative positions of the line-shaped light distributions of the different illumination situations are changed in each case by an absolute angle value.

17. Method according to claim 11, wherein a plurality of illumination situations are set in temporal succession, wherein the relative positions of the line-shaped light distributions of the different illumination situations are changed in each case by an absolute angle value.

* * * * *

UNITED STATES PATENT AND TRADEMARK OFFICE
CERTIFICATE OF CORRECTION

| | |
|---|---|
| PATENT NO. | : 12,105,271 B2 |
| APPLICATION NO. | : 17/378991 |
| DATED | : October 1, 2024 |
| INVENTOR(S) | : Tiemo Anhut, Daniel Schwedt and Yauheni Novikau |

It is certified that error appears in the above-identified patent and that said Letters Patent is hereby corrected as shown below:

In the Specification

Column 14, Lines 21-22:
Now reads: (after 3P thus set,): "a stripe structure of the light sheets 9 is generated (strip structures and their orientations are merely symbolic)."
Should read: -- a stripe structure of the light sheets 9 is generated (stripe structures and their orientations are merely symbolic). --

Column 15, Line 3:
Now reads: "18 Laser focus $18_{1in}$ Line-shaped light distribution"
Should read: -- 18 Laser focus
$18_{1in}$ Line-shaped light distribution --

Signed and Sealed this
Nineteenth Day of November, 2024

Katherine Kelly Vidal
*Director of the United States Patent and Trademark Office*